US011503914B2

(12) United States Patent
Bastiyali et al.

(10) Patent No.: US 11,503,914 B2
(45) Date of Patent: Nov. 22, 2022

(54) RESERVABLE LOUNGE CHAIR AND METHOD OF USE

(71) Applicants: Tarkan Bastiyali, New York, NY (US); Viktoriya Bastiyali, New York, NY (US)

(72) Inventors: Tarkan Bastiyali, New York, NY (US); Viktoriya Bastiyali, New York, NY (US)

( * ) Notice: Subject to any disclaimer, the term of this patent is extended or adjusted under 35 U.S.C. 154(b) by 357 days.

(21) Appl. No.: 16/835,571

(22) Filed: Mar. 31, 2020

(65) Prior Publication Data

US 2020/0329878 A1 Oct. 22, 2020

Related U.S. Application Data

(60) Provisional application No. 62/835,497, filed on Apr. 18, 2019.

(51) Int. Cl.
| | |
|---|---|
| *A47C 1/14* | (2006.01) |
| *A47C 7/72* | (2006.01) |
| *G06Q 50/12* | (2012.01) |
| *A47C 7/66* | (2006.01) |
| *G06Q 10/02* | (2012.01) |

(52) U.S. Cl.
CPC ............... *A47C 1/143* (2013.01); *A47C 7/66* (2013.01); *A47C 7/723* (2018.08); *A47C 7/727* (2018.08); *G06Q 10/02* (2013.01); *G06Q 50/12* (2013.01)

(58) Field of Classification Search
CPC ........... A47C 1/143; A47C 7/66; A47C 7/727; A47C 7/72; A47C 7/624; A47C 7/622; G06Q 10/02
USPC ........................................................ 297/217.3
See application file for complete search history.

(56) References Cited

U.S. PATENT DOCUMENTS

| | | | | |
|---|---|---|---|---|
| 6,092,868 A | * | 7/2000 | Wynn ..................... | A47C 7/723 297/188.05 |
| 9,390,571 B1 | * | 7/2016 | Kupfer .................... | A47C 1/143 |
| 2019/0145153 A1 | * | 5/2019 | Edelman ................ | A47C 1/143 297/188.01 |
| 2021/0007498 A1 | * | 1/2021 | Dorsainvil ............... | H02J 7/35 |
| 2021/0145184 A1 | * | 5/2021 | High, Jr. ................. | A47C 7/72 |
| 2022/0092486 A1 | * | 3/2022 | Al-Qebaisi ............ | G06Q 10/02 |

FOREIGN PATENT DOCUMENTS

| | | | | |
|---|---|---|---|---|
| EP | 3289926 A1 | * | 3/2018 | ............. A47C 1/143 |
| GB | 2558986 A | * | 7/2018 | ............. A47C 1/143 |
| WO | WO-2014006161 A1 | * | 1/2014 | ............. A47C 1/143 |

\* cited by examiner

*Primary Examiner* — Milton Nelson, Jr.
(74) *Attorney, Agent, or Firm* — MG Miller Intellectual Property Law LLC

(57) ABSTRACT

A system relates generally to a reservable lounge chair and its method of use is disclosed. The reservable lounge chair is capable of restricting unauthorized access, and the reservable lounge chair may be reserved.

18 Claims, 5 Drawing Sheets

RESERVABLE LOUNGE CHAIR AND METHOD OF USE

CLAIM OF PRIORITY

This application claims priority to U.S. Provisional Patent Application No. 62/835,497 entitled "A RESERVATION SYSTEM FOR OUTDOOR SEATING AT WATER ESTABLISHMENTS", filed on Apr. 18, 2019, the contents of which are incorporated by reference, in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owners have no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to a reservable lounge chair and its method of use. In particular, the present disclosure and the embodiments contained therein relate to a reservable lounge chair and its method of use whereby the reservable lounge chair may be reserved through an internet-enabled electronic device and whereby the reservable lounge chair is capable of restricting access to said chair unless it has been reserved.

BACKGROUND

When people go on beach vacations, many people enjoy lounging on a chair on the beach. However, too often these lounge chairs are offered on first-come, first-serve basis, and users are required to pay for the use of the chair, and potentially a beach umbrella, upon arrival. For guests who stayed up late the night before, or decide to do something with their morning before heading to the beach, lounge chairs are often not available, potentially ruining the guest's beach plans.

Even if all of the lounge chairs have not been taken, the few chairs that are available will likely be in the less desirable areas, despite those lounge chairs costing the same as the chairs in the more desirable parts of the beach, and they also cost the same regardless of how long the chair is reserved for. Further compounding this problem is the fact that beach goers often arrive at the beach at the same time causing the staff assisting with the lounge chairs to be unable to accommodate the rush of clients, often resulting in long delays when people arrive at the beach. If someone forgets cash, tipping the staff becomes a chore.

As such, there is a need for a way for people to reserve lounge chairs in outdoor locations where the people do not have to interact with staff, can reserve the chairs for portions of time less than the full day, and where chairs can command a rate appropriate for the quality of location of the chair.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

SUMMARY

An aspect of an example embodiment in the present disclosure is to provide a chair having a front end, a rear end, a left side, a right side, a seat member, an attached box, a memory, a processor, a battery, a user restriction mechanism, and an unlocking mechanism. The seat member extends between the front end, the rear end, the left side, and the right side and is configured to support the weight of a human user. The seat member also has a torso portion and a leg portion, where the torso portion is sized and configured to receive the torso of a human user, where the log portion is sized and configured to receive one or both legs of a human user. The chair in accordance with the present disclosure also includes a solar panel which has a top surface and a bottom surface. The top surface is equipped with a photovoltaic cell, and the bottom surface is equipped with a cushion, where the cushion is preferably white or some other light color that heat quickly dissipates from. In various embodiments, the solar panel is sized and configured to provide shade over all or a portion of the seat member. The user restriction mechanism can be used to selective allow access to the chair. Specifically, when the chair has been reserved, the user restriction mechanism will be disengaged, allowing a user to use the seat member. However, when the reservation has expired, in some embodiments, the user restriction mechanism will re-engage, thereby restricting use of the seat member and the chair. In some embodiments the unlocking mechanism is a pin pad.

The attached box is located proximately to the seat member, and the attached box has an exterior casing which envelopes an interior chamber. The exterior casing has a closable lid which provides access to the interior chamber. In various embodiments, the attached box includes a speaker, and optical identifier, and a status indicator. In other embodiments, the interior chamber includes a means for sanitizing the interior chamber, such as an infrared or ultraviolet light. Preferably, the unlocking mechanism, the user restriction mechanism, the processor, the memory, the battery, the speaker, the attached box, and/or the solar panel are in electronic communication.

In some embodiments, the chair in accordance with the present disclosure includes a first arm rest proximate to the left side and a second arm rest proximate to the right side. When equipped, the speaker can be configured to indicate an amount of time left on a reservation. When equipped, the status indicator is configured to display an alphanumeric indicator corresponding to the chair, and a color indicator corresponding to a reservation status of the chair. In a preferred embodiment, the attached box is a faraday cage such that it will prevent the transmission of electronic signals from a device or devices placed within the attached box. In other embodiments, the interior chamber of the attached box includes a means for charging one or more electronics, the interior chamber being in electronic communication with the battery and the processor.

Optionally, the chair in accordance with the present disclosure can be equipped with an electronic display which is in electronic communication with the memory, the processor, and the battery. Preferably, this electronic display is a touch-sensitized electronic display and is configured to allow a user to order one or more concessions from a nearby vendor and/or display one or more advertisements. In some embodiments, the chair in accordance with the present disclosure includes a holographic display which is in electronic communication with the processor, the memory, and the battery.

The present disclosure also provides for a method of reserving one or more chairs in accordance with the present disclosure. The method beings by first providing one or more of said chairs, which is internet-enabled. The method also provides an end-user electronic device which is internet-enabled, and a remote server which is also internet-enabled. Once these components have been provided, the user restriction mechanism on the chair is activated, preventing users from using the chair(s). Each of the chairs in this method will be assigned an alphanumerical identifier, and the end-user electronic device will be provided with a software interface used to reserve one or more of the chairs. From there a human user will utilize the software interface to select one or more chairs to be reserved, based on the chair's alphanumerical identifier, and the user will then select the amount of time to reserve the one or more chairs.

Once the one or more chairs has been selected, the status indicator light on the selected chair(s) will change to show that said chair(s) are not available for reservation, at the appropriate time. If within said time, and upon the input of a code by the human user, the user restriction mechanism will deactivate, allowing for use of the seat member. Upon the expiration of the reserved time, the user restriction mechanism will activate, and the status indicator light will change and to show that the one or more chairs are available for reservation.

In some embodiments, the method in accordance with the present disclosure will allow a user to select, through the software interface, whether one or more electronic devices should be locked within the attached box. If this option is selected, the method will also include inserting, the one or more electronic devices within the interior chamber and then subsequently locking the attached box for the amount of time the one or more chairs is reserved. In some embodiments, the attached box will automatically unlock at the end of the amount of time. In other embodiments the attached box unlocks upon entry of a predetermined key code on the pin pad. In yet another embodiment, the holographic display will display the amount of time remaining on the reservation. Optionally, one or more advertisements may be displayed on the electronic display.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

DETAILED DESCRIPTION OF THE PREFERRED EMBODIMENTS

The present disclosure provides for a reservable lounge chair and its method of use as shown and described.

Figure 1:
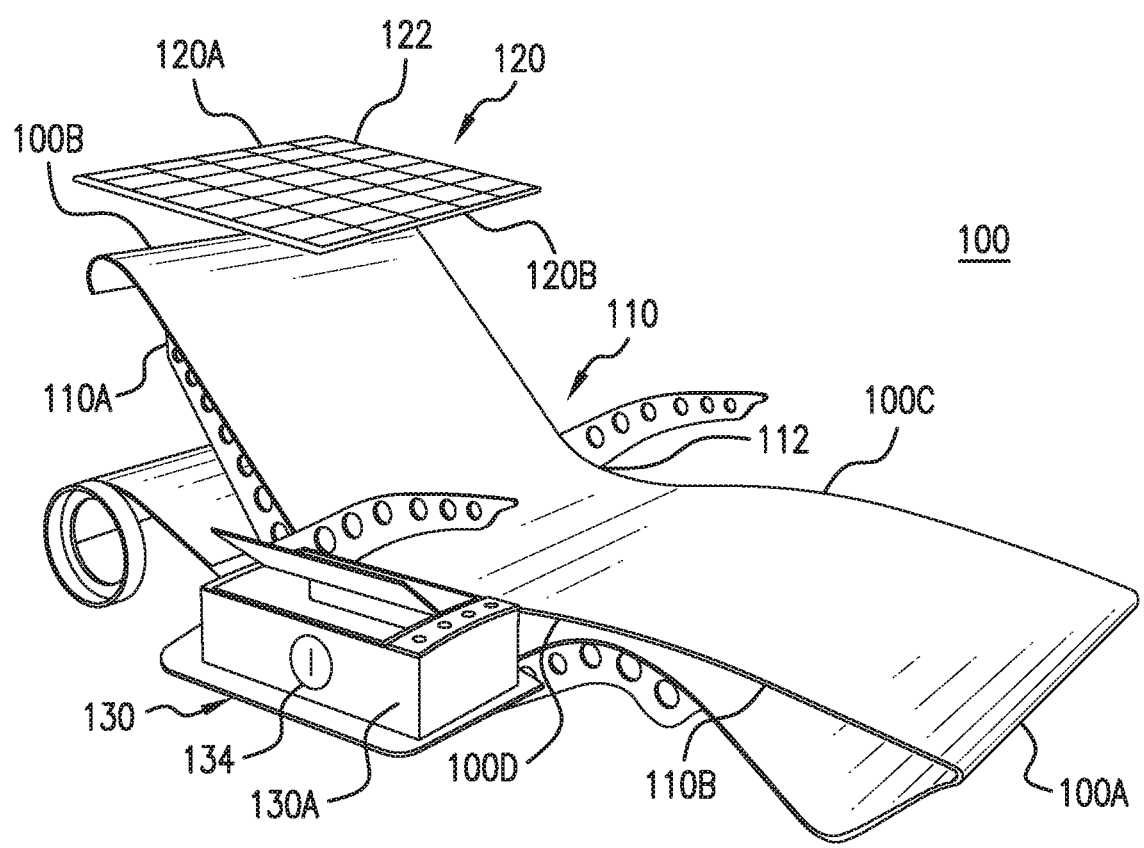
FIG. 1 shows a perspective view of an embodiment of the chair in accordance with the present disclosure.

Referring to FIG. 1, a chair 100 is shown. Here, the chair 100 has a front end 100A, a rear end 100B, a left side 100C, and a right side 100D. The chair 100 also has a seat member 110, which is comprised of a torso portion 110A and a leg portion 110B, and also has a first top surface 112. Preferably, the chair 100 is constructed out of a lightweight aluminum material, although other materials such as plastic will also be suitable for use.

The chair 100 also has a solar panel 120 located above the seat member 110. Preferably, the solar panel 120 has a second top surface 120A, which is equipped with a photovoltaic cell 122, and a bottom surface 120B. In some embodiments, the bottom surface 120B is equipped with padding or cushions. Preferably, this padding or cushion is white or some other light color that does not hold heat well. Additionally, the chair 100 includes an attached box 130. While the attached box 130 will be discussed in greater detail below, this view features a status indicator light 134 disposed on an exterior casing 130 of the attached box 130. In some embodiments, the solar panel 120 has dimensions of 12" by 24". In other embodiments, the solar panel 120 is sized to provide shade over the torso portion 110A. This has the benefit of providing the functionality of a beach umbrella without needing a separate umbrella. By having the solar panel 120 be integrated with the chair 100, it will provide a meaningful improvement in comfort and ease of use, both for the establishment that owns the chair 100 and for the user.

The status indicator light 134 can serve a variety of functions. Primarily, the status indicator light 134 will display a color coordinated with the status of the chair 100. In some embodiments, a green light means that the chair is available for reservations, a yellow light means the chair is reserved, and a red light indicates that a reservation of a chair has concluded. By having the status indicator light 134 show the status of the chair, a user will be able to determine the status of a chair without having to use an associated app displayed on the user's internet-enabled electronic device, such as a smartphone or tablet.

Figure 2:
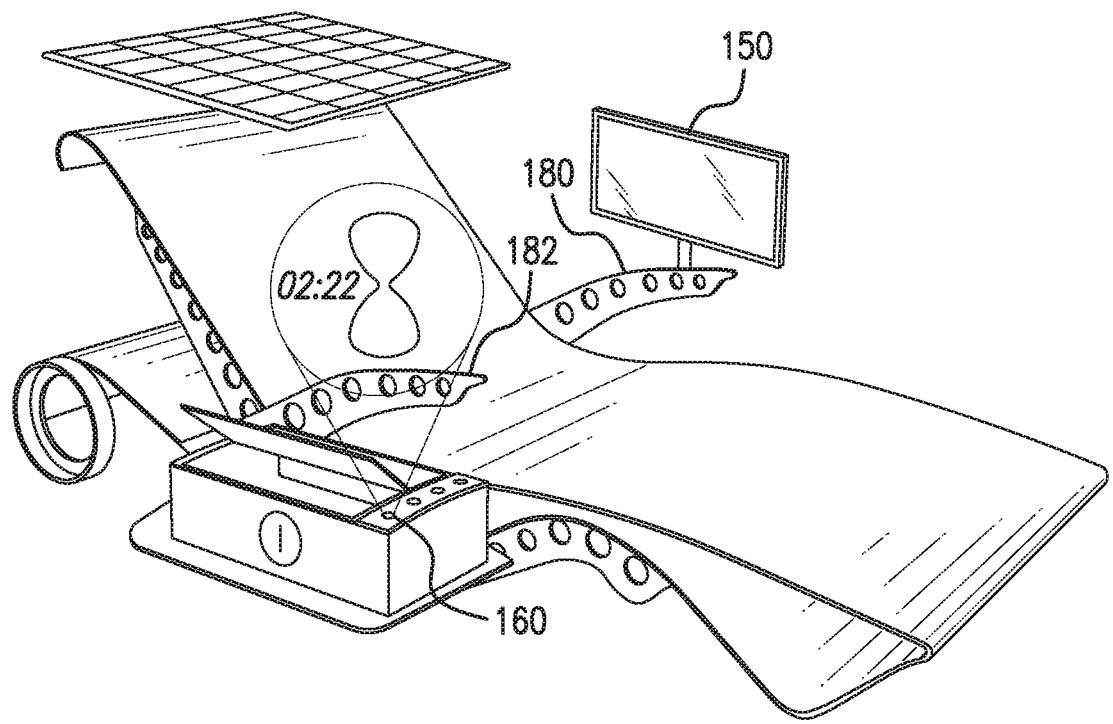
FIG. 2 shows a perspective view of a second embodiment of the chair in accordance with the present disclosure.

FIG. 2 shows an alternative embodiment of the chair 100 in accordance with the present disclosure. Here, the chair 100 includes a first arm rest 180 and a second arm rest 182. Also shown in this view is a holographic display 160. In the embodiment shown here, the chair 100 has an electronic display 150 attached to the first arm rest 180. In a preferred embodiment, the electronic display 150 is a touch-sensitized display capable of receiving touch-input from a human user. In various embodiments, the electronic display 150 can service a variety of purposes. In one embodiment, the electronic display 150 will show the name of a user who has reserved the chair 100, and the amount of time that the chair 100 has been reserved for. This can be displayed in terms of minutes, hours, or can be shown as a time range. In other embodiments where the electronic display 150 is touch-sensitized, the electronic display can be used to order food or beverages from a local establishment. In these embodiments, the chair 100 is capable of connecting to the internet through a wireless internet protocol, such as Wi-Fi or Bluetooth®. In other embodiments, the electronic display 150 can be rented to display one or more advertisements.

In some embodiments, users are able to reserve various other activities. Such reservations can be for activities including jet skis, canoes and paddles, equipment for canoe polo, kayaks, inflatable tubes, banana boats, water bikes, glass-bottom boats, kitesurfing equipment and/or lessons, kiteboarding equipment and/or lessons, water skiing equipment and/or lessons, barefoot skiing equipment and/or lessons, bodyboarding equipment or lessons, fishing equipment, flyboarding equipment and/or lessons, windsurfing equipment and/or lessons, kneeboarding equipment and/or lessons, paddle-boarding equipment and/or lessons, parasailing equipment and/or lessons, picigin ball equipment, beach volleyballs, aqua jogging lessons, diving lessons, rafting equipment and/or lessons, rowboats, yacht racing lessons, skim-boarding equipment and/or lessons, surfing equipment and/or lessons, wakeboarding equipment and/or lessons, cable skiing equipment and/or lessons, water polo equipment, wake surfing equipment and/or lessons, and snorkel equipment.

Figure 3A:
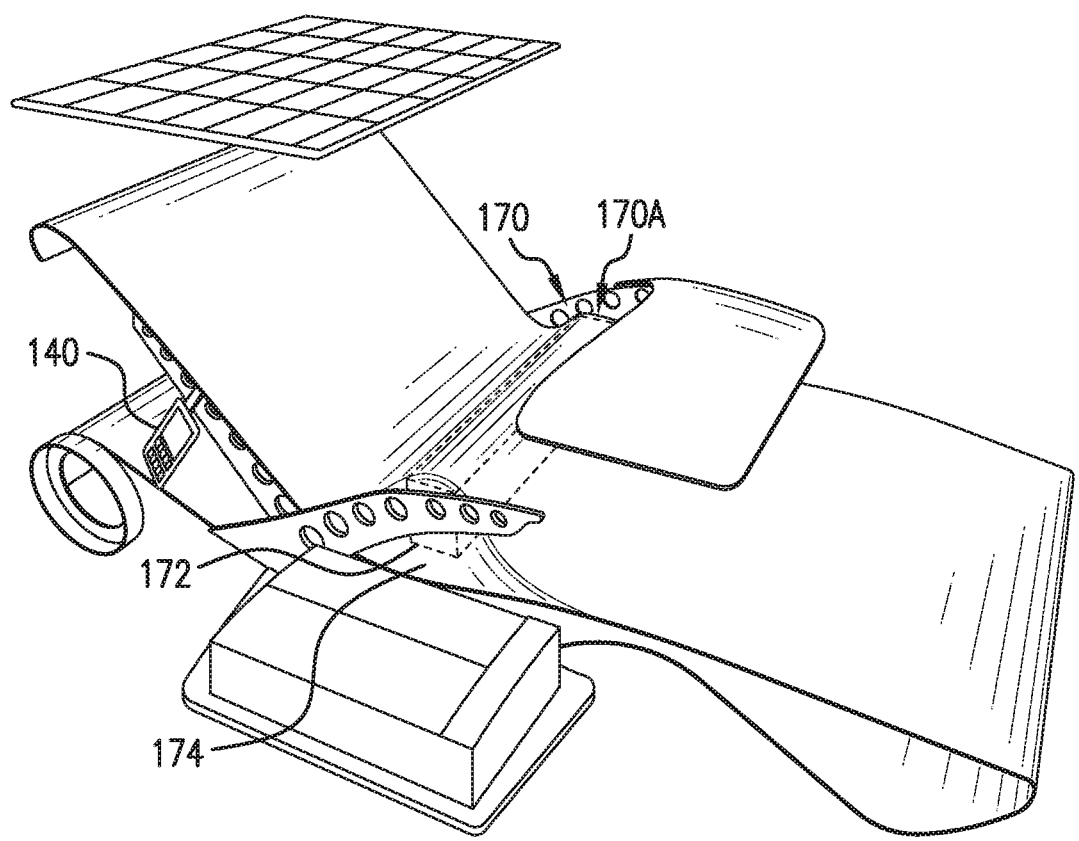
FIGS. 3A and 3B show a perspective view of a third embodiment of the chair in accordance with the present disclosure, highlighting the functionality of the user restriction mechanism also in accordance with the present disclosure.
Figure 3B:
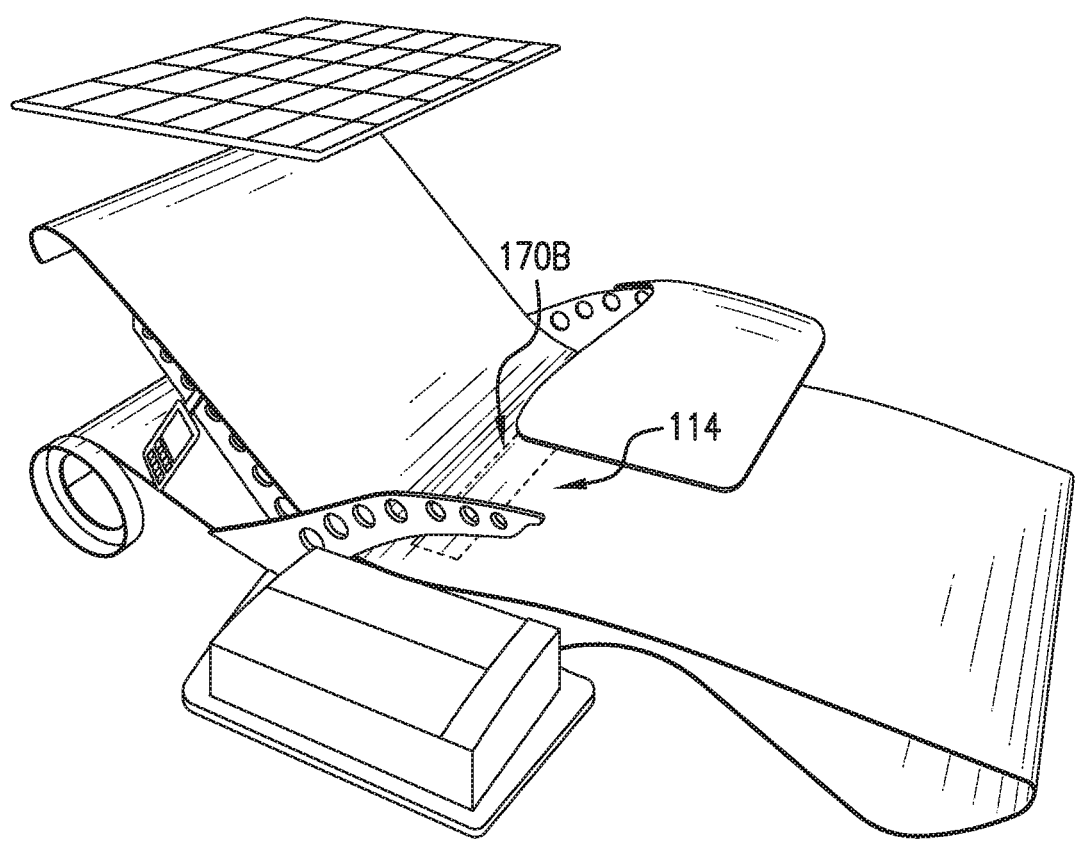

Referring to FIGS. 3A and 3B, an embodiment of the chair 100 is shown, showing how a user restriction mechanism 170 functions. The user restriction mechanism 170 is constructed out of a blocking member 172 and an actuator 174, where the actuator is configured to move the blocking member 172 from a first position 170A, shown in FIG. 3A to a second position 170B, shown in FIG. 3B. When the user restriction mechanism 170 is in the first position 170A, a human user will be restricted from utilizing the chair 100. The user will be able to use the unlocking mechanism 140 to transition the user restriction mechanism 170 from the first position 170A to the second position 170B. When the user restriction mechanism 170 is in the second position 170B, the seat member 110 (See FIG. 1) will be substantially in line with a plane 114.

In this embodiment, the unlocking mechanism 140 is a pin pad, although in other embodiments the unlocking mechanism 140 displays an optical identifier, such as a QR code which can be scanned by an appropriate internet-enabled electronic device to transition the user restriction mechanism 170 from the first position 170A to the second position 170B. Other embodiments exist where the chair 100 has both a pin pad and an optical identifier as unlocking mechanisms. In those embodiments, a user would scan the optical identifier with an appropriate internet-enabled electronic device, such as a smartphone, and will be provided with a code which is to be entered on the pin pad. Once the appropriate code has been entered on the pin pad, the user restriction mechanism 170 will transition from the first position 170A to the second position 170B. Other embodiments exist where the user restriction mechanism 170 can be operated remotely, through the internet, by a third party. This would enable establishments with multiple chairs 100 to accommodate larger parties, or to place all of the user restriction mechanism 170 in the first position 170A at the end of the day.

Various methods for reserving a chair 100 in accordance with the present disclosure are contemplated. In a highly preferred embodiments, the chair 100 is reserved through a software application on a user's internet-enabled electronic device, such as a smartphone or tablet. The application will display a layout of the chairs in accordance with the present disclosure in a certain region, as well as indicators for whether the chairs are already reserved, and optionally for what period of time the chairs have been reserved for. In some embodiments, a separate internet-enabled electronic device is required for each chair to be reserved. Once a user selects which chair or chairs they are interested in, the user will be presented with the option of whether they want their electronic devices to be inaccessible during the reservation. If selected, after a user places their electronic(s) in the attached box, the attached box will remain locked, via a locking mechanism, for the duration of the reservation.

Upon arriving at a reserved chair, a user may optionally set a separate pin to access the attached box. This is done in a manner similar to that of a standard hotel safe. If the user selected that they do not want electronics to be available during the reservation, this option will not be available. Also, upon arriving a user will need to initiate the disengagement of the user restriction mechanism 170, using the unlocking mechanism 140 and/or optical identifier as previously described. In some embodiments, a user will be able to push a button on the chair 100 in order to have the holographic display 160 show the amount of time remaining on the reservation. In various embodiments, the establishment will have the ability to set different rates for reserving the chair, based on location, time of day, any subscriptions purchased by the user, or some combination thereof. It is possible for the establishment to assess additional fees if a user overstays their reservation. Alternatively, the user restriction mechanism 170 can automatically engage after broadcasting a warning message at the end of the reservation.

Figure 4:
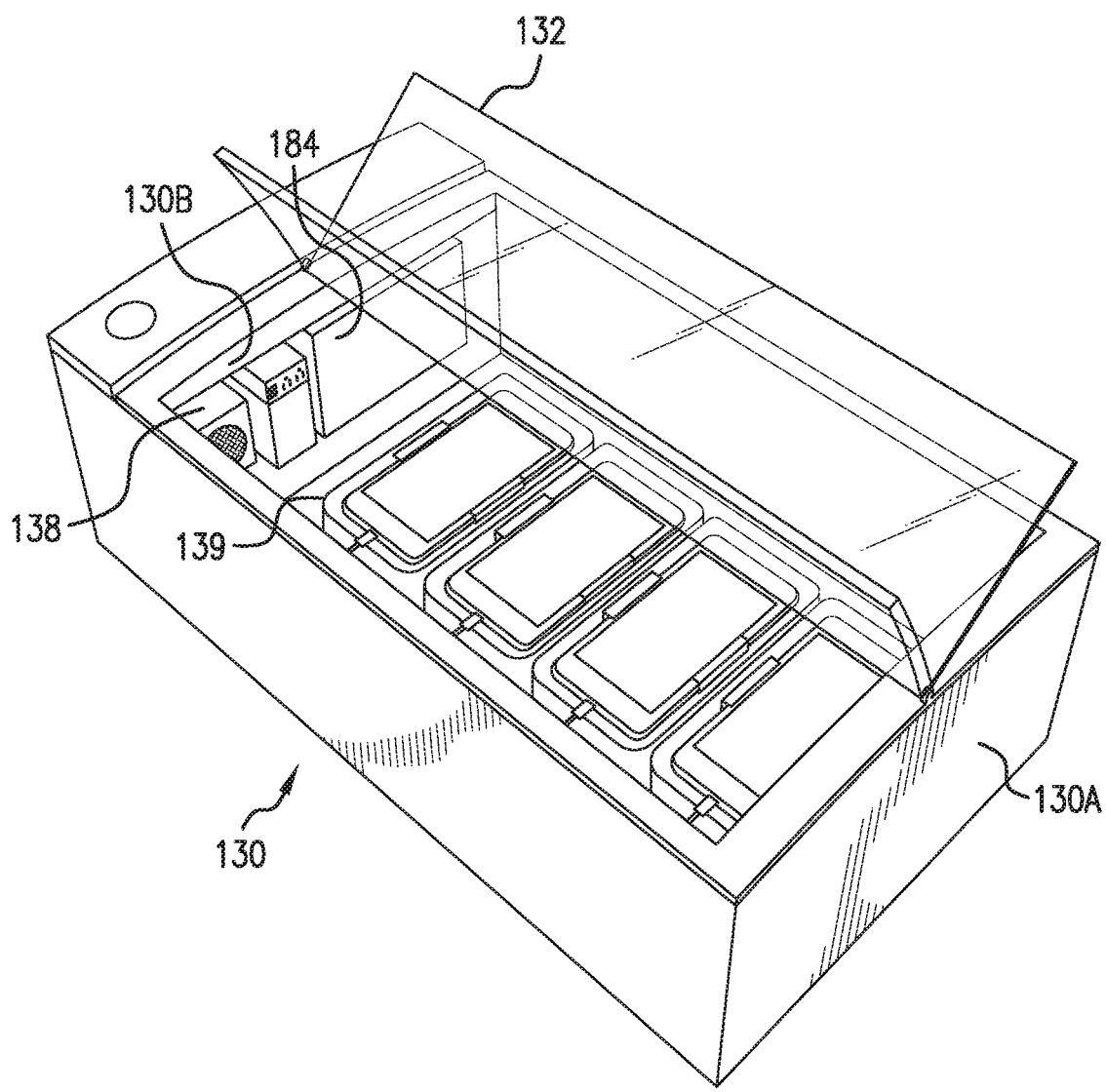
FIG. 4 shows a perspective view of an embodiment of the attached box in accordance with the present disclosure.

In some embodiments, the attached box 130 in accordance with the present disclosure will have a means for sterilizing or disinfecting the interior chamber 130B (See FIG. 4). This can be achieved through an infrared or ultraviolet light capable of illuminating the entirety of the interior chamber 130B. In other embodiments, the attached box 130 is a faraday cage such that radiation will not be emitted from the attached box 130, despite what electronics are within the attached box 130, when the closable lid 132 (See FIG. 4) of the attached box is closed.

Referring to FIG. 4, a detailed perspective view of an embodiment the attached box 130 in accordance with the present disclosure is shown. Here, the attached box 130 is comprised of an exterior casing 130A which envelops an interior chamber 130B. The interior chamber 130B includes multiple means for charging one or more electronics 139. Such means include standard power outlets for chargers to be plugged into, integrated charging cables specific to a variety of popular electronic devices, and/or one or more wireless charging pads. The attached box 130 also includes a closable lid 132. The closable lid may be left open, or it may be locked for a predetermined amount of time, which preferably coincides with an amount of time the chair 100 has been reserved for. Also contained within this embodiment of the attached box 130 is a speaker 138. The speaker 138 can be configured to audibly announce an amount of time remaining on a reservation or can be configured to play music from an electronic device, such as a smartphone or tablet. While the speaker 138 is shown within the interior chamber 130B, many embodiments exist where the speaker 138 is located on the exterior casing 130A, or on some other component of the chair 100. Also shown within the interior chamber 130B is a battery 184, which is used to power any electrical components of the chair 100, as well as to charge any electronic devices placed within the interior chamber 130B. In many embodiments, the battery 184 is in electronic communication with the solar panel 120, which can use the photovoltaic cell 122 to absorb sunlight to charge the battery

184. Preferably, a charge controller will be in electronic communication with the battery 184 to limit the rate at which electric current flows to or from the battery 184.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, "a first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is a disclosure that relates generally to a reservable lounge chair and its method of use. In particular, the present disclosure and the embodiments contained therein relate to a reservable lounge chair and its method of use whereby the reservable lounge chair may be reserved through an internet-enabled electronic device and whereby the reservable lounge chair is capable of restricting access to said chair unless it has been reserved. The disclosure is illustrated by example in the drawing figures, and throughout the written description. It should be understood that numerous variations are possible, while adhering to the inventive concept. Such variations are contemplated as being a part of the present disclosure.

What is claimed is:

1. A chair, comprising:
a front end; a rear end; a left side; a right side;
a seat member having a torso portion having a first top surface which is substantially in line with a plane and a leg portion, a solar panel located above the seat member, the solar panel having a second top surface and a bottom surface, the second top surface being equipped with a photovoltaic cell, the bottom surface being equipped with a cushion;
an attached box proximate to the seat member, the attached box having an exterior casing which envelops an interior chamber, the exterior casing having a closable lid for providing access to the interior chamber, a speaker, an optical identifier, and a status indicator, wherein the attached box has a means for sanitizing the interior chamber;
a processor;
a memory;
a battery; and
a user restriction mechanism having a blocking member and an actuator configured to actuate the blocking member from a first position above the plane to a second position below the plane, the user restriction mechanism being in electronic communication with the processor, the memory, and the battery,
wherein the seat member extends between the front end, the rear end, the left side, and the right side and is configured to support the weight of a human user,
wherein the solar panel is sized and configured to provide shade over the torso portion, and
wherein the processor, the memory, the battery, the speaker, and the solar panel are in electronic communication.

2. The chair of claim 1, the chair further comprising a first arm rest proximate to the left side and a second arm rest proximate to the right side.

3. The chair of claim 2, the attached box being lockable, wherein the speaker is configured to indicate an amount of time left on a reservation.

4. The chair of claim 3, the status indicator being configured to display an alphanumeric indicator corresponding to the chair, and a color indicator corresponding to a reservation status of the chair.

5. The chair of claim 4, the attached box being a faraday cage.

6. The chair of claim 5, the interior chamber further comprising a means for charging one or more electronics, the interior chamber being in electronic communication with the battery and the processor.

7. The chair of claim 6, the user restriction mechanism being configured to selectively restrict access to the seat member.

8. The chair of claim 7, further comprising an unlocking mechanism configured to allow a user to transition the user restriction mechanism between the first position and the second position, the unlocking mechanism being a pin pad.

9. The chair of claim 8, further comprising an electronic display in electronic communication with the memory, the processor, and the battery.

10. The chair of claim 9, the electronic display being a touch-sensitized electronic display.

11. The chair of claim 10, the electronic display being configured to allow a human user to order one or more concessions from a nearby vendor and being configured to display one or more advertisements.

12. The chair of claim 11, further comprising a holographic display in electronic communication with the processor, the memory, and the battery.

13. A method of reserving one or more chairs, each chair having a front end, a rear end, a left side, a right side, a seat member having a torso portion having a first top surface which is substantially in line with a plane and a leg portion, a solar panel located above the seat member, an attached box, a status indicator light, and a user restriction mechanism, the method comprising the steps of:
providing an end-user electronic device, and a remote server, wherein the one or more chairs, the end-user electronic device, and the remote server are all in electronic communication, wherein the user restriction mechanism is activated;
assigning an alphanumerical identifier to each of the one or more chairs;
providing a software interface on the end-user electronic device;
selecting, through the software interface, the one or more chairs to be reserved, based on the alphanumerical identifier;
selecting, through the software interface, an amount of time for the one or more chairs to be reserved;
changing the status indicator light to show that the one or more chairs are not available for reservation;
deactivating, upon input of a code by a human user, the user restriction mechanism to allow for use of the seat member; and
activating, the user restriction mechanism at the end of the amount of time;
changing the status indicator light to show that the one or more chairs are available for reservation.

14. The method of claim 13, further comprising the steps of:
selecting, through the software interface, whether one or more personal electronic devices should be locked;
inserting, the one or more personal electronic devices within an interior chamber of the attached box;
locking the attached box for the amount of time the one or more chairs is reserved.

15. The method of claim 14, further comprising the step of automatically unlocking the attached box at the end of the amount of time.

16. The method of claim 14, further comprising the step of unlocking the attached box upon entry of a predetermined key code on a pin pad.

17. The method of claim 14, further comprising the step of, displaying the amount of time remaining, by a holographic display.

18. The method of claim 17, further comprising the step of displaying one or more advertisements on an electronic display.

* * * * *